(12) United States Patent
Angyal et al.

(10) Patent No.: US 11,400,893 B2
(45) Date of Patent: Aug. 2, 2022

(54) WIPER FRAME

(71) Applicant: Robert Bosch GmbH, Stuttgart (DE)

(72) Inventors: Adam Angyal, Sátoraljaújhely (HU); Thomas Belmans, Tessenderlo (BE); Marcello Bubba, Linden (BE); Peter Deak, Budapest (HU)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/764,230

(22) PCT Filed: Oct. 17, 2018

(86) PCT No.: PCT/EP2018/078395
§ 371 (c)(1),
(2) Date: May 14, 2020

(87) PCT Pub. No.: WO2019/096526
PCT Pub. Date: May 23, 2019

(65) Prior Publication Data
US 2020/0391700 A1 Dec. 17, 2020

(30) Foreign Application Priority Data
Nov. 15, 2017 (DE) .................... 10 2017 220 325.0

(51) Int. Cl.
*B60S 1/38* (2006.01)
(52) U.S. Cl.
CPC ......... *B60S 1/38* (2013.01); *B60S 2001/3827* (2013.01); *B60S 2001/3836* (2013.01)

(58) Field of Classification Search
CPC ............... B60S 1/38; B60S 2001/3836; B60S 2001/3827; B60S 2001/3837;
(Continued)

(56) References Cited

U.S. PATENT DOCUMENTS 2,011,015 A * 8/1935 Schleicher ................ B60S 1/38
15/250.4
3,636,583 A * 1/1972 Rosen ....................... B60S 1/38
15/250.48
(Continued)

FOREIGN PATENT DOCUMENTS

CN 104691508 6/2015
DE 10025630 * 12/2001
(Continued)

OTHER PUBLICATIONS

Machine translation of description portion of French publication 2918618, published Jan. 2009. (Year: 2009).*
(Continued)

*Primary Examiner* — Gary K. Graham
(74) *Attorney, Agent, or Firm* — Michael Best & Friedrich LLP (57) ABSTRACT

Disclosed is a wiper frame (10) comprising a resilient support rail (22) and a wiper blade (12) which is attached to the support rail (22). According to the invention, the wiper blade (12) has a wiper blade lip (44) having a substantially rigid cross-sectional structure, and the wiper blade lip (44) is mounted between a first bending region (32) and a second bending region (34) in a cross-sectional view.

17 Claims, 7 Drawing Sheets

(58) Field of Classification Search
CPC .... B60S 1/3877; B60S 1/3875; B60S 1/3874; A47L 13/11; A47L 1/06
USPC .............. 15/250.48, 250.361, 250.41, 245
See application file for complete search history.

(56) References Cited

U.S. PATENT DOCUMENTS

| | | | | |
|---|---|---|---|---|
| 4,524,481 | A | * | 6/1985 | Koomen .................. B60S 1/38 15/250.41 |
| 4,956,890 | A | * | 9/1990 | Journee .................. B60S 1/38 15/250.48 |
| 6,230,358 | B1 | * | 5/2001 | Sahara .................... B60S 1/38 15/245 |
| 2002/0053113 | A1 | * | 5/2002 | Boland .................... B60S 1/38 15/250.48 |
| 2006/0265830 | A1 | * | 11/2006 | Walworth ............ B60S 1/3808 15/236.02 |

FOREIGN PATENT DOCUMENTS

| | | | |
|---|---|---|---|
| DE | 10044913 | | 12/2001 |
| DE | 102008041077 | * | 2/2010 |
| DE | 102013215154 | | 2/2012 |
| DE | 102012215641 | * | 3/2014 |
| EP | 1591330 | | 11/2005 |
| FR | 2846929 | | 5/2004 |
| FR | 2918618 | | 1/2009 |
| WO | 2011000403 | | 1/2011 |

OTHER PUBLICATIONS

Machine translation of description portion of German publication 10025630, published Dec. 2001. (Year: 2001).*
International Search Report for Application No. PCT/EP2018/078395 dated Jan. 18, 2019 (English Translation, 2 pages).

* cited by examiner

Fig. 7

WIPER FRAME

BACKGROUND

The invention relates to a wiper frame.

Numerous wiper frames are already known, for example in DE 100 44 913 A1, which comprise a resilient support rail and a wiper blade, wherein the wiper blade is attached to the support rail.

Such wiper frames have a relatively large overall height. Depending on the structure of the wiper blade, this may lead to unpleasant wind noises and the wiping pattern is further impaired by unfavorable aerodynamics.

Moreover, reversing noises are produced in such wiper frames in the turning regions, which is perceived as troublesome, in particular in stationary vehicles in which frequently the internal combustion engine is switched off and in vehicles with an electric drive.

SUMMARY

The wiper frame according to the invention has the advantage that the wiper blade lip has a substantially rigid cross-sectional structure and the wiper blade lip is mounted between a first bending region and a second bending region in a cross-sectional view. In this manner, troublesome noises are minimized, an optimal wiping result is obtained and a small overall height achieved.

In a simple and thus advantageous embodiment, a first attachment region, which adjoins at least the first bending region, is provided for attaching the wiper blade lip to the support rail.

It is also simple and thus advantageous if a second attachment region, which adjoins the second bending region and which is provided for attaching the wiper blade lip to the support rail, is provided.

It is particularly advantageous if the first bending region and/or the second bending region comprises at least one support shoulder for supporting the wiper blade lip. In this manner the wiping pattern is even further improved.

In an embodiment which is able to be produced in a particularly simple manner and thus is advantageous, the wiper blade lip has a substantially triangular outer contour in cross section.

A particularly effective damping is advantageously achieved by the first bending region having a first stabilizing region and a first resilient region.

It is also advantageous if the second bending region has a second stabilizing region and a second resilient region.

In this case it is particularly advantageous if the first resilient region and/or the second resilient region directly adjoins the wiper blade lip.

A particularly effective wiping pattern is achieved when the first support shoulder is provided on the first stabilizing region.

It is also advantageous if the second support shoulder is provided on the second stabilizing region.

In a simple cost-effective and thus advantageous embodiment the support rail is configured as a spring rail which has a planar cross section and which has longitudinal edges, wherein the first attachment region and/or the second attachment region encompasses the longitudinal edges in a clamp-like manner.

It is also simple, cost-effective and thus advantageous if the support rail is divided into two in the longitudinal direction and comprises a first rail part and a second rail part, wherein the first attachment region mounts the wiper blade between the first rail part and the second rail part.

BRIEF DESCRIPTION OF THE DRAWINGS

Various exemplary embodiments of the invention are shown in the drawings and described in more detail in the following description. In the drawings.

DETAILED DESCRIPTION

Figure 1:
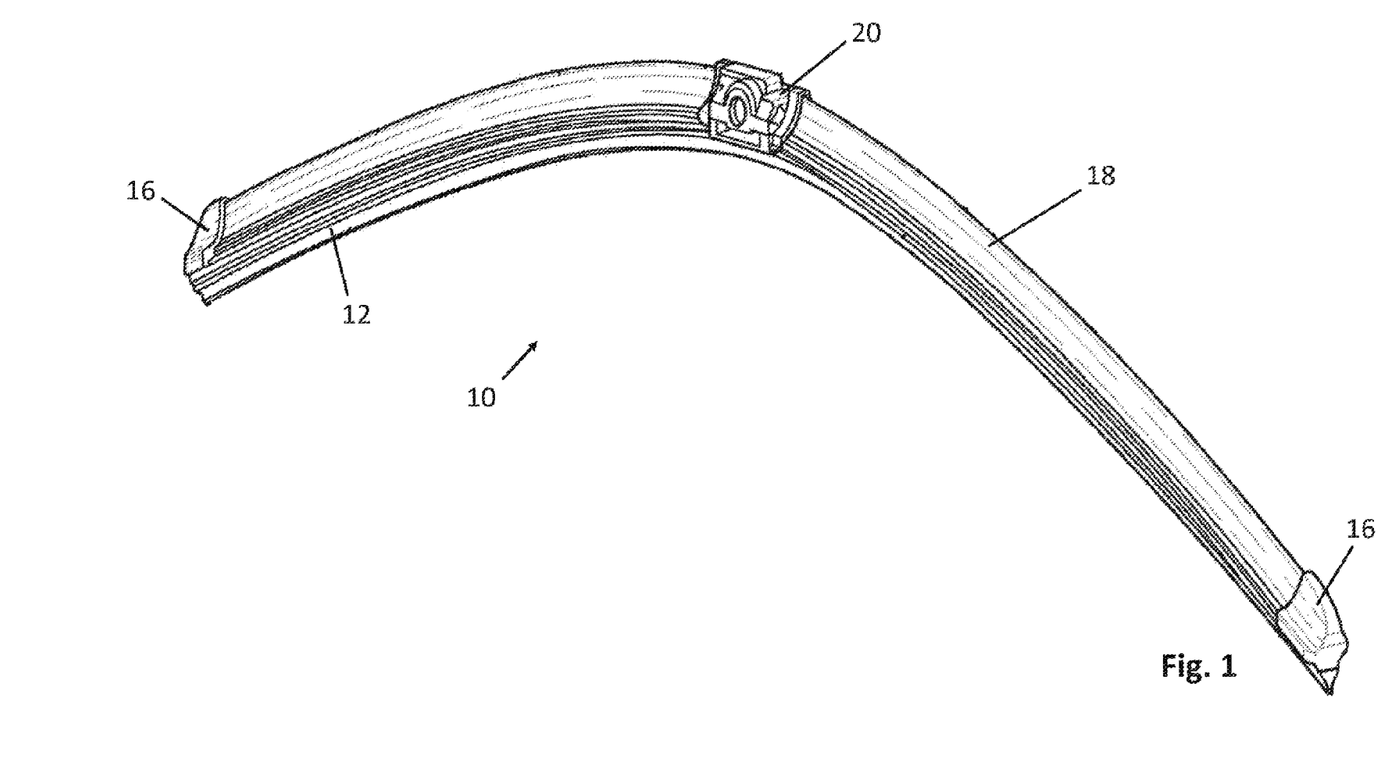
FIG. 1 shows a wiper frame according to the invention in a perspective view.
Figure 2:
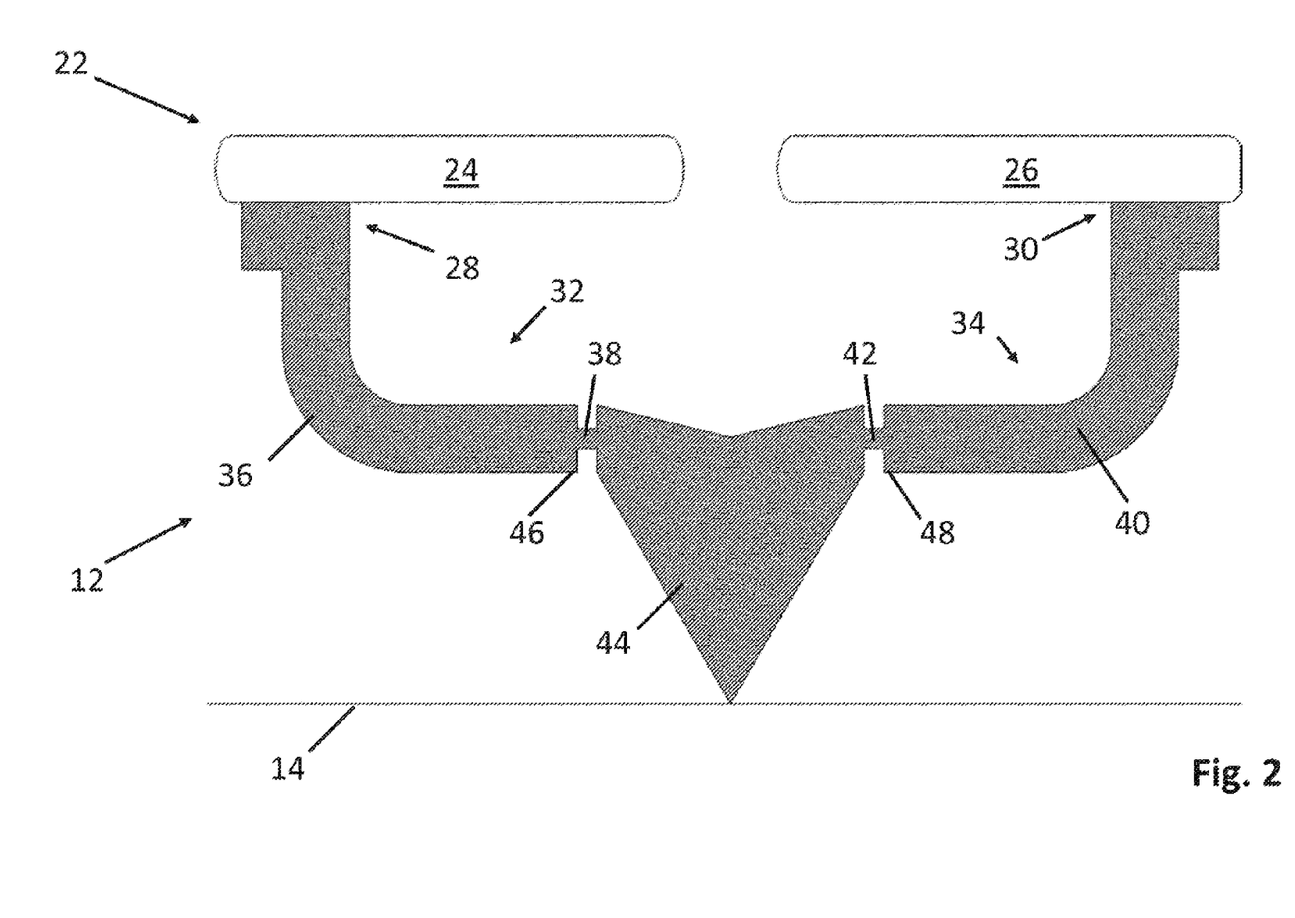
FIG. 2 shows a cross section through a support rail and wiper blade of a wiper frame according to the invention.

In FIG. 1 a wiper frame 10 according to the invention is shown in a perspective view. The wiper frame 10 according to the invention comprises a wiper blade 12 which in the mounted position bears against a windshield 14 (FIG. 2). The wiper frame 10 is of substantially elongated design and has in each case at the ends of its longitudinal extent an end cap 16 which in each case terminates the wiper frame 10 in the longitudinal direction. A further wind deflection strip 18, which during operation additionally pushes the wiper frame 10 onto the windshield 14, is provided in this case on the side remote from the wiper blade 12. An attachment element 20 which serves for attaching the wiper frame 10 to a wiper arm, not shown for the sake of clarity, is also arranged on the side remote from the wiper blade 12.

In FIG. 2 a cross section through a wiper frame 10 according to the invention is shown in detail. For reasons of clarity the wind deflection strip 18 has been omitted (FIG. 1). The wiper frame 10 has a support rail 22, the wiper blade 12 being attached thereto. The support rail 22 in this case is designed to be divided so that it comprises a first rail part 24 and a second rail part 26. However, a one-piece embodiment is also possible and expedient. The wiper blade 12 is bonded to the lower face of the support rail 22 facing the windshield 14. To this end, the wiper blade 12 has a first attachment region 28 and a second attachment region 30. A flexible first bending region 32 adjoins the first attachment region 28. Similarly, a flexible second bending region 34 adjoins the second attachment region 30.

The first bending region 32 comprises a flexible first stabilizing region 36 and a first resilient region 38 which is even more flexible or resilient than the first stabilizing region 36. Similarly, the second bending region 34 comprises a flexible second stabilizing region 40 and a second resilient region 42 which is also even more flexible than the second stability region 40. The wiper blade 12 also has a wiper blade lip 44 which is of substantially triangular design in cross section and which is configured to be substantially rigid relative to its cross section. The wiper blade lip 44 is mounted by the first resilient region 38 and by the second resilient region 42, so that the substantially rigid wiper blade lip 44 may move in the direction of the first stability region 36 or the second stability region 40.

The first bending region 32, or more specifically the first stability region 36 of the first bending region 32, and the second bending region 34 and/or the stability region 40 thereof are configured to be elongated in cross section and initially run downwardly from the first attachment region 28 and/or the second attachment region 30 approximately perpendicularly from the support rail 22 and have a horizontal region after a bend of approximately 90 degrees. The first stability region 36 and the second stability region 40 are thus approximately L-shaped, and/or reverse L-shaped in cross section.

The wiper blade lip 44 adjoins the horizontal regions of the first stability region 36 and/or the second stability region 40 via the first resilient region 38 and/or the second resilient region 42. The thickness of the first stability region 36 and the second stability region 40 in cross section is approximately 1 millimeter. The thickness of the first resilient region 38 and of the second resilient region 42 in this case is approximately 0.4 millimeters. The first resilient region 38 and the second resilient region 42 in this case protrude in the cross section approximately centrally from the front face of the L-shaped limb of the first stability region 36 and/or the second stability region 40. The width of the first resilient region 38 and the second resilient region 42, i.e. the spacing between the first stability region 36 and/or the second stability region 40 and the wiper blade lip 44 is approximately 0.3 millimeters.

Since the wiper blade lip 44 is mounted between the first resilient region 38 and the second resilient region 42, it has a certain mobility due to the resilience of the first bending region 32 and the second bending region 34. The wiper blade lip 44 is thus able to rotate and/or tilt slightly. For limiting this mobility, a first support shoulder 46 and a second support shoulder 48 are provided, the wiper blade lip 44 striking thereagainst in the case of an excessive rotation and/or tilting about an imaginary axis located perpendicular to the drawing plane.

Figure 3:
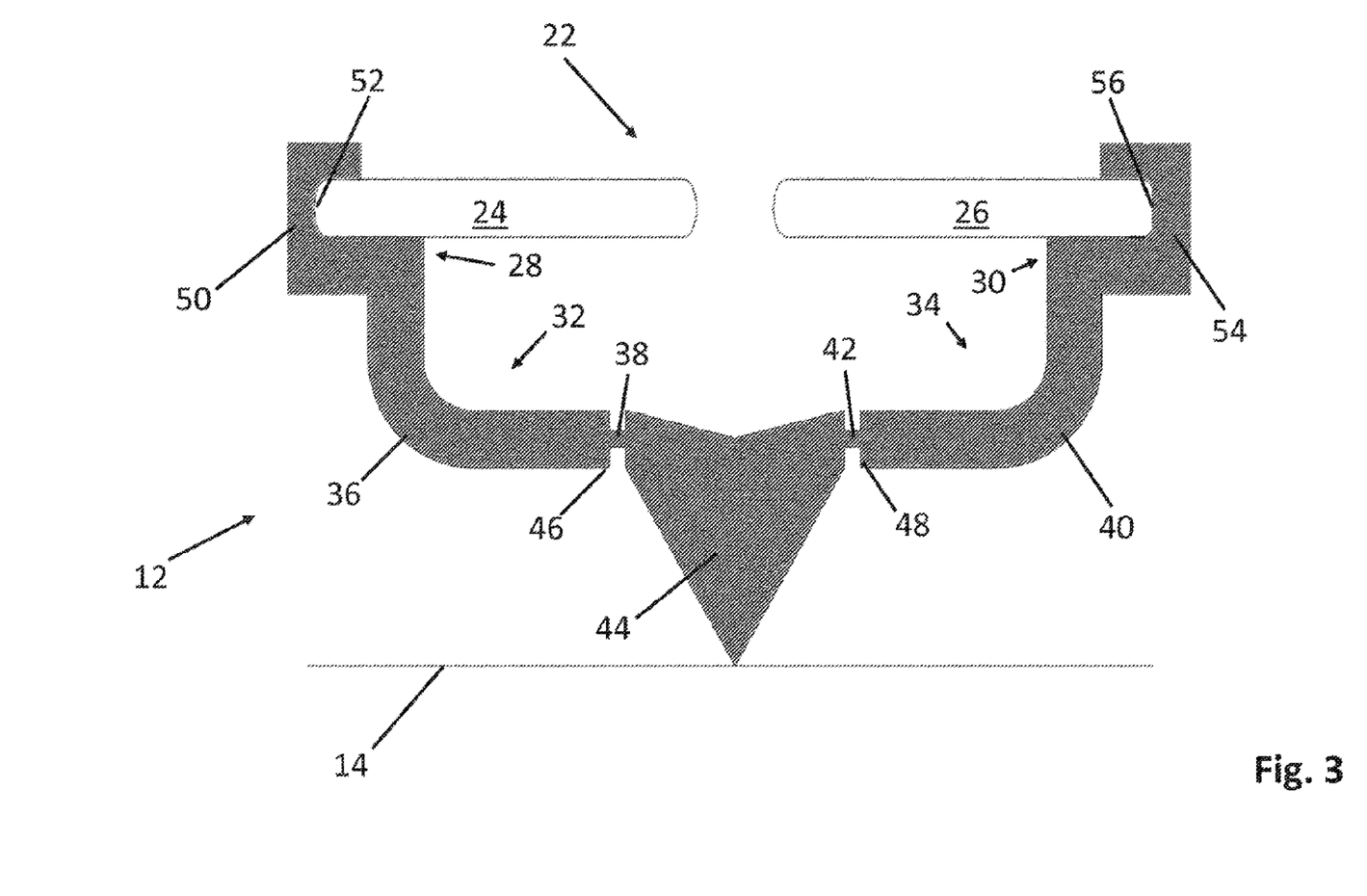
FIG. 3 shows a variant of the cross section of FIG. 2.

A variant of the wiper blade shown in FIG. 2 is shown in FIG. 3. In order to avoid repetition only the difference between the first attachment region 28 and the second attachment region 30 are described here. Moreover, the exemplary embodiment is identical to that of FIG. 2. The embodiments of FIG. 2 thus apply hereinafter.

The first attachment region 28 of the wiper blade 12 comprises a clamp-like first portion 50 which nestles around a first longitudinal edge 52 of the support rail 22. Similarly the second attachment region 30 has a second portion 54 which nestles around a second longitudinal edge 56 of the support rail 22. Adhesive or a different attachment means may also be used in addition to this clamp-like attachment between the second attachment region 30 and the support rail 22 and/or between the first attachment region 28 and the support rail 22.

Figure 4:
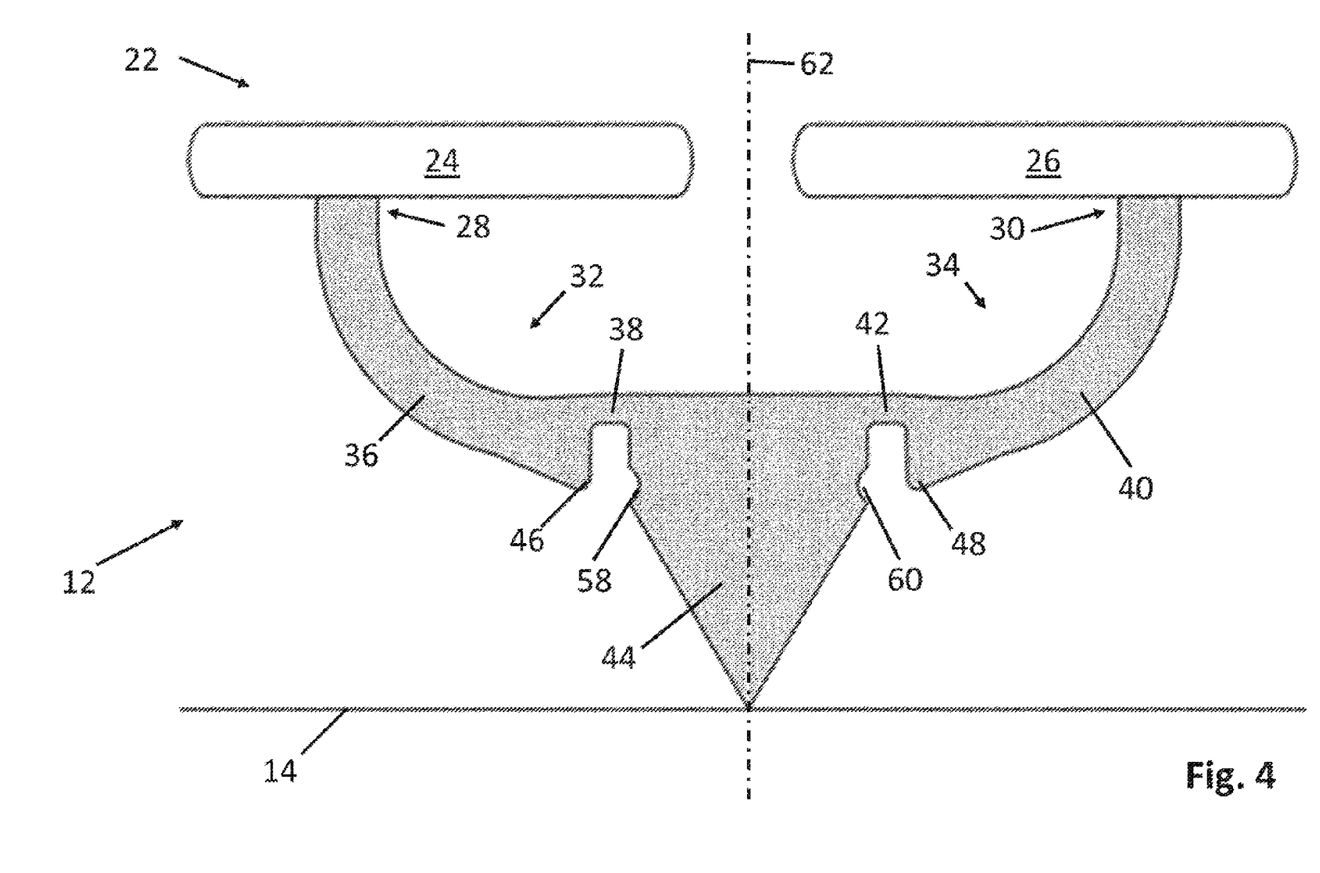
FIG. 4 shows a further variant of the cross section of FIG. 2.

In FIG. 4 the cross section of FIG. 2 is shown in a variant. The support rail 22 mounts the wiper blade 12 with the first rail part 24 and the second rail part 26. As in the above examples, however, the support rail 22 may also be designed in one piece in this case. The wiper blade 12 is bonded to the support rail 22 but a different attachment may also be used here, for example that shown in FIG. 3.

The first stabilizing region 36 of the first bending region 32, which is also of elongated L-shaped or C-shaped design, adjoins the first attachment region 28. At the free end of the first stabilizing region 36, i.e. the end remote from the first attachment region 28, the thickness of the first stabilizing region 36, to which the first resilient region 38 is adjoined, is slightly enlarged and thus the first support shoulder 46 is formed on the side of the stabilizing region 36 remote from the support rail 22. Whilst in the above exemplary embodiments the first resilient region 38 extends approximately centrally from the first stabilizing region 36, in this case the first resilient region 38 is configured on the side of the stabilizing region 36 facing the support rail 22, so that the first support shoulder 46 is formed on the side remote from the support rail 22 and the first resilient region 38 is arranged on the side facing the support rail 22. The wiper blade lip 44 adjoins the first resilient region 38. The front face of the first stability region 36 which forms the first support shoulder 46 in this case runs approximately perpendicular to a plane formed by the support rail 22; the same applies to the front face of the second stability region 40.

The wiper blade lip 44 is of substantially triangular design and in cross section has a first cut-out 58, at the height of the first support shoulder 46, which is provided for receiving the first support shoulder 46 during operation. This is shown in detail in FIG. 5. The thickness of the first stability region 36 and the second stability region 40 in this case is approximately 0.85 millimeters, and the thickness of the first resilient region 38 and the second resilient region 42 is approximately 0.4 millimeters. The width of the first resilient region 38 and the second resilient region 42 is approximately 0.34 millimeters.

The second resilient region 42 of the second bending region 34 adjoins the side of the wiper blade lip 44 remote from the first resilient region 38. The second resilient region 42 in turn is arranged on the side of the stabilizing region 40 facing the support rail 22, wherein once again the second support shoulder 48 which is able to engage in a second cut-out 60 in the wiper blade lip 44 is arranged on the side remote from the support rail 22. Also in this case the second stabilizing region 40 is slightly enlarged in the direction of the wiper blade lip 44. The second attachment region 30 adjoins the second stabilizing region 40, said second attachment region in turn being connected to the support rail 22.

As in the above exemplary embodiments, in this exemplary embodiment the wiper blade 12 is also configured symmetrically in cross section relative to its central axis which is shown here as a dashed dotted line 62.

Figure 5:
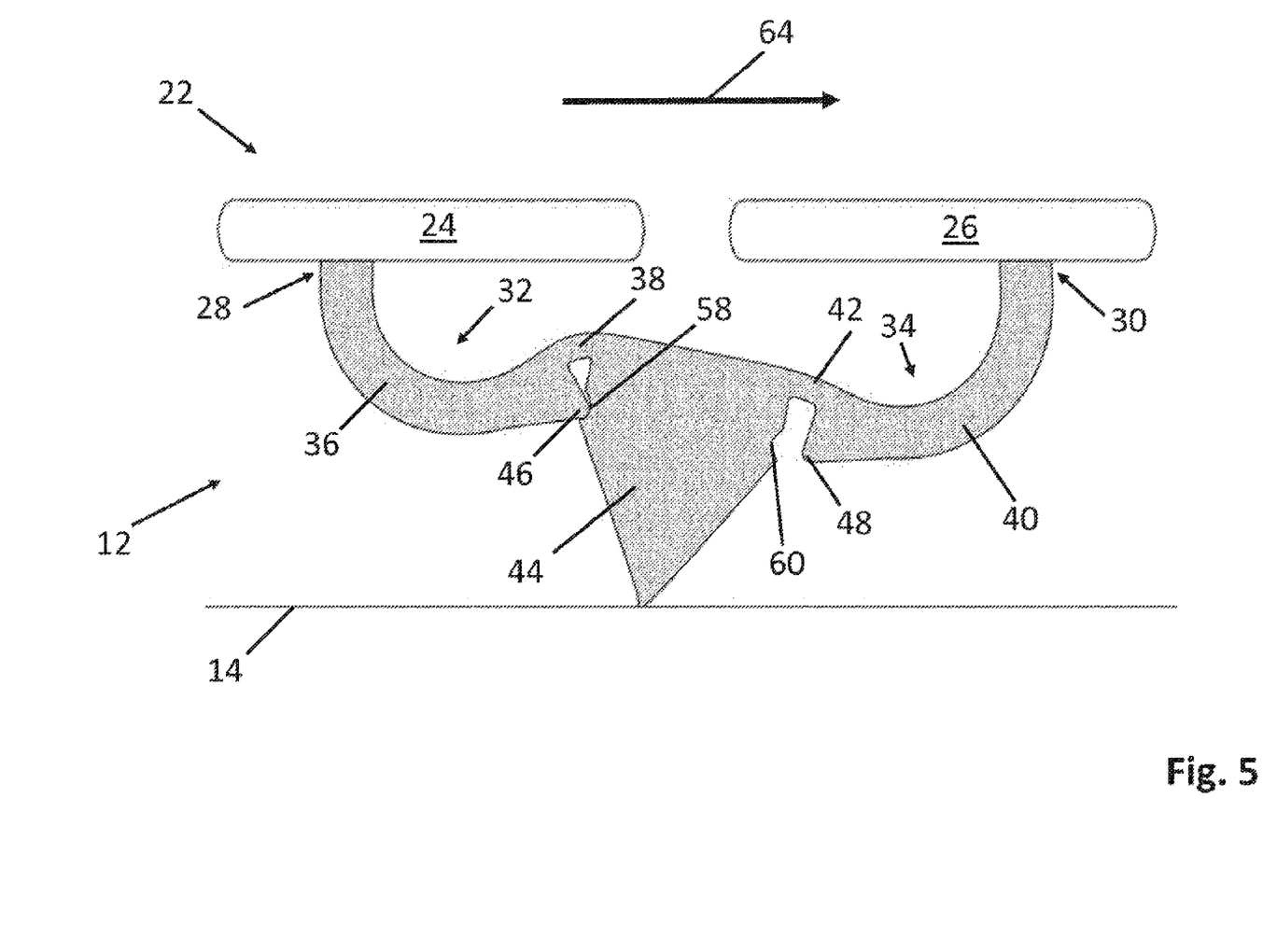
FIG. 5 shows a cross section of FIG. 4 during a wiping process.

In FIG. 5 the wiper frame of FIG. 4 is shown during a wiping motion. The wiping motion in this case runs from left to right in the drawing plane and is illustrated by the directional arrow 64. In order to avoid repetition only the differences from FIG. 4 are described here. The embodiments of FIG. 4 apply in this regard hereinafter.

If the wiper frame 10 is moved over the windshield 14 in the direction of the directional arrow 64, the wiper blade lip 44 bearing against the windshield 14 is thus entrained according to its movement potential. The first resilient region 38 permits the wiper blade lip 44 to deflect counter to the direction of entrainment (directional arrow 64) until the point at which the support shoulder 46 prevents the wiper blade lip 44 from further deflection. The first cut-out 58, in which the first support shoulder 46 engages, is additionally provided to this end. As a whole, the first bending region 32 and the second bending region 34, thus also the first stabilizing region 36 and the second stabilizing region 40, are slightly deflected thereby.

The same occurs during a movement counter to the directional arrow 64 but then accordingly the second bending region 34, in particular the second resilient region 42, is deflected.

In a variant, the first stability region 36 and the second stability region 40 may also be configured to be relatively rigid, so that only the wiper blade lip 44 moves and the first resilient region 38 and the second resilient region 42 cooperate in the manner of a film hinge.

Figure 6:
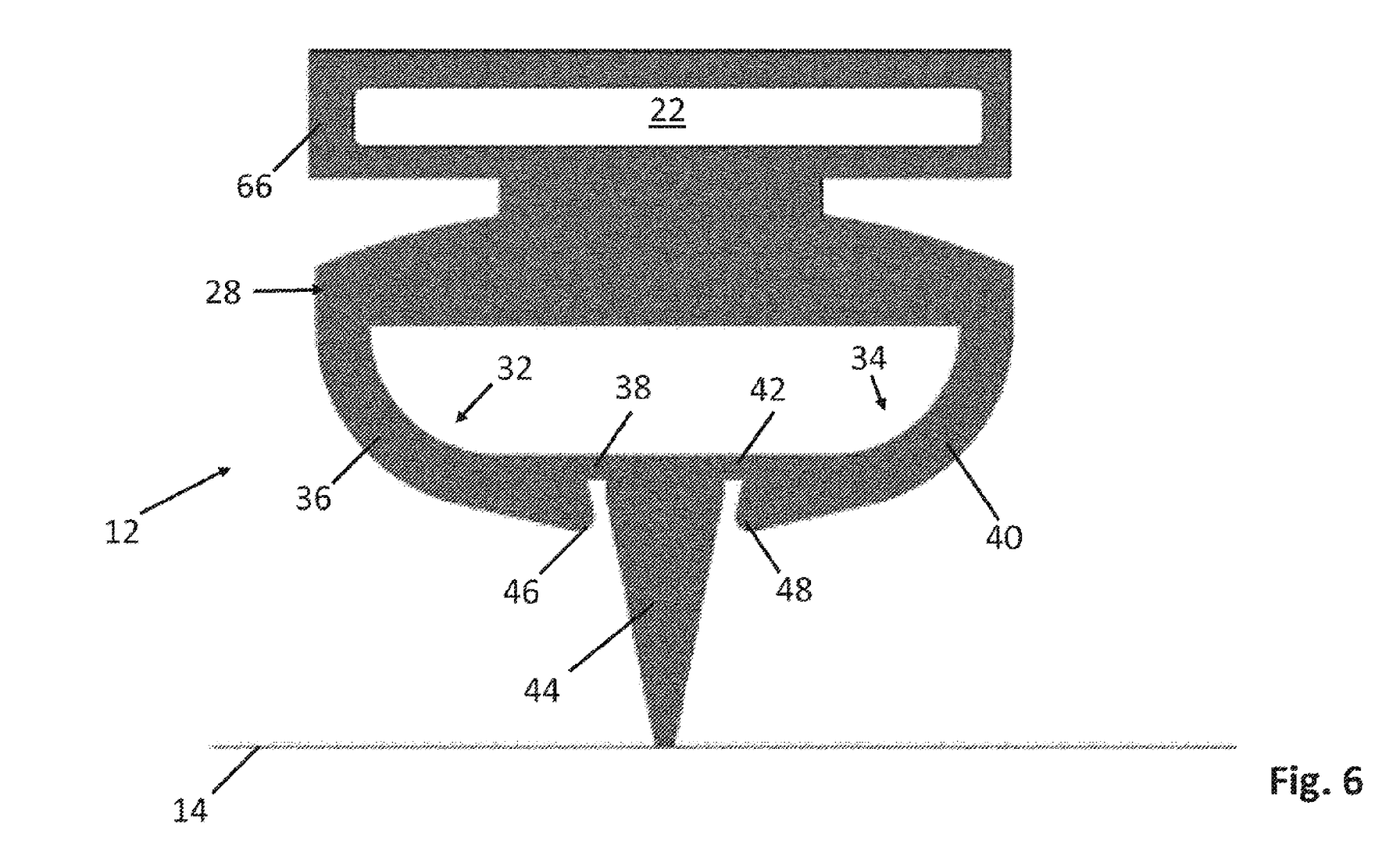
FIG. 6 shows a cross section through a wiper blade in a variant and FIG. 7 shows a further variant of a cross section through a wiper frame according to the invention.

In FIG. 6 a variant of the wiper blade 12 of a wiper frame 10 according to the invention is shown in cross section. The wiper blade lip 44 is mounted between the first bending region 32 and the second bending region 34. To this end, the first bending region 32 has the first resilient region 38 and the second bending region 34 has the second resilient region 42, which are connected to the wiper blade lip 44. Both the first bending region 32 and the second bending region 34 in cross section are of elongated design and connected at one end to the wiper blade lip 44. The other end of the first bending region 32 is connected to the first attachment region 28. In contrast to the above examples, the second bending region 34 is also connected here to the first attachment region 28. The first attachment region 38 is configured in this case such that in cross section it encompasses the wiper blade lip 44, the first bending region 32 and the second bending region 34. On the side remote from the wiper blade lip 44, the first attachment region 28 is connected to an encasing region 66 which encases the support rail 22.

As in the above example, the first resilient region 38 is arranged on the end of the first stability region 32 remote from the first attachment region 28, and namely on the side facing the support rail 22. The first support shoulder 36 is configured on the side of the first stability region 36 remote from the support rail 22. The same applies to the second bending region 34. This second bending region is, however, also attached to the first attachment region 28 and is of substantially elongated design. The second stability region 40, which is of substantially elongated C-shaped design in cross section and which is configured at its end to be slightly broader, extends from the first attachment region 28. In contrast to the above examples, the end of the first stability region 36 on its front face, which forms the first support shoulder 46, in cross section is approximately parallel to the wiper blade lip 44, i.e. slightly oblique to a plane formed by the support rail 22. The same applies to the front face of the second stability region 40.

At this end, i.e. on this front face, the second resilient region 42 is arranged on the side facing the support rail 22 and the second support shoulder 48 is formed on the side remote from the support rail 22. The wiper blade lip 44 is retained between the first resilient region 38 and the second resilient region 42, wherein the first resilient region 38 and the second resilient region 42 mount the wiper blade lip 44 in the manner of film hinges.

In this exemplary embodiment it is expedient to produce the wiper blade 12 in a multi-component extrusion method. In this case, the encasing region 66 may be produced, for example, from a plastics material which is different from the wiper blade lip 44, the first bending region 32 and the second bending region 34.

Figure 7:
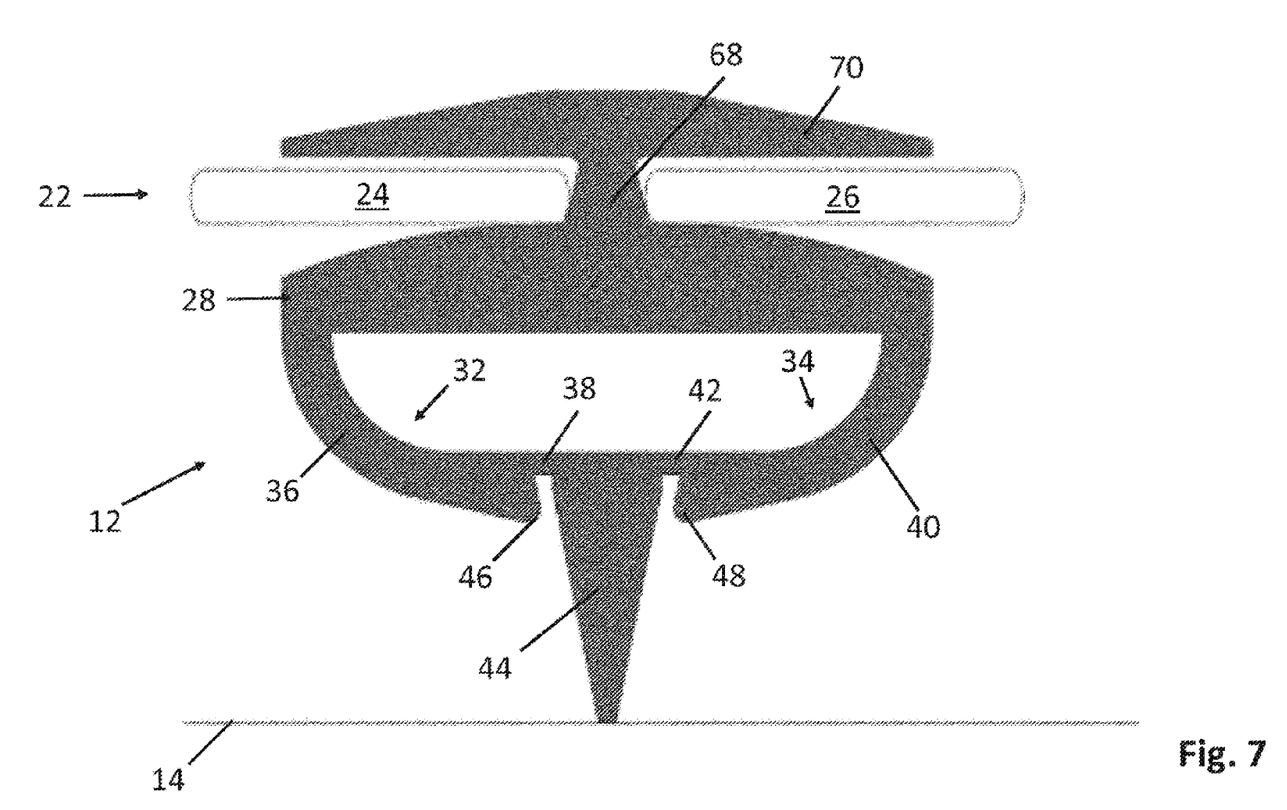

In FIG. 7 a further variant of a wiper frame 10 according to the invention is shown in cross section. In order to avoid repetition only the difference from the exemplary embodiment of FIG. 6 is described here. The descriptions from the above exemplary embodiment with the corresponding reference numerals apply in this regard hereinafter. The support rail 22 is designed in this case so as to be divided into two. The first attachment region 28 has a through-portion 68 between the first rail part 24 and the second rail part 26, which feeds into a cover portion 70 which is broader than the spacing between the first rail part 24 and the second rail part 26. Thus grooves are formed between the cover portion 70 and the lower part of the first attachment region 28, the first rail part 24 and/or the second rail part 26 engaging therein.

The first attachment region 28 on the side facing the support rail 22 is designed to be rounded or crowned. With a slight tilting of the first attachment region 28, said attachment region does not strike against the support rail 22 but rolls silently thereon.

In all of the exemplary embodiments, the wiper blade lip 44, the first bending region 32, the second bending region 34 and the first attachment region 28 and the second attachment region 30, thus the entire wiper blade 12, are produced from resilient material, for example rubber, made of natural rubber or EPDM. The entire wiper blade 12 may thus be produced in a single-component or multi-component extrusion method. The support rail 22 is configured from steel, for example, from a steel strip stamped from a roll, but the support rail may also be configured from plastics material.

In principle, i.e. for all exemplary embodiments described herein, the material thickness of the first stability region 36 and the second stability region 40 is between 0.6 and 1.5 mm, in particular between 0.8 and 1.1 mm, preferably approximately 1 mm. The material thickness, as the thickness of the first resilient region 38 and the second resilient region 42, is between 0.2 and 0.6 mm, preferably between 0.3 and 0.5 mm, ideally ca. 0.4 mm. The width of the first resilient region 38 and the width of the second resilient region 42, i.e. the spacing between the first stability region 36 and the wiper blade lip 44 and/or the spacing between the second stabilizing region 40 and the wiper blade lip 44, is between 0.05 mm and 0.8 mm, in particular between 0.1 and 0.6 mm, preferably approximately 0.35 mm. In a variant of the invention a plurality of resilient regions, i.e. more than two resilient regions, may be provided on each side. These resilient regions may thus correspondingly alternate with a plurality of stability regions along the longitudinal extent of the first bending region 32 and/or the second bending region 34.

What is claimed is:

1. A wiper frame (10) comprising a resilient support rail (22) and a wiper blade (12) which is attached to the support rail (22), characterized in that the wiper blade (12) has a wiper blade lip (44) having a substantially rigid cross-sectional structure and the wiper blade lip (44) is mounted between an elongated first bending region (32) and a second bending region (34) in a cross-sectional view,
   wherein the first bending region (32) extends from the resilient support rail (22) to a first support shoulder (46) at a free terminal end of the first bending region, the first support shoulder (46) defining a transition to a first resilient region (38) having a cross-sectional thickness that is at most half of a cross-sectional thickness of the first bending region (32),
   wherein the first support shoulder (46) is configured to engage the wiper blade lip (44) when the wiper blade lip (44) rotates or tilts as a result of moving in a wiping motion,
   wherein the first bending region (32), the second bending region (34), the first resilient region (38), and the wiper blade lip (44) all intersect a same plane that extends parallel to the resilient support rail (22),
   wherein a width of the first resilient region (38) is defined as a distance the first resilient region (38) extends between the wiper blade lip (44) and the free terminal end of the first bending region (32), and
   wherein the width of the first resilient region (38) is between 0.05 mm and 0.8 mm.

2. The wiper frame (10) as claimed in claim 1, characterized in that a first attachment region (28), which adjoins at least the first bending region (32), is provided for attaching the wiper blade lip (44) to the support rail (22).

3. The wiper frame (10) as claimed in claim 2, characterized in that a second attachment region (30), which adjoins the second bending region (34) and which is provided for attaching the wiper blade lip (44) to the support rail (22), is provided.

4. The wiper frame (10) as claimed in claim 3, characterized in that the second bending region (34) comprises at least one second support shoulder (48) for supporting the wiper blade lip (44).

5. The wiper frame (10) as claimed in claim 3, characterized in that the support rail (22) is configured as a spring rail which has a planar cross section and which has longitudinal edges (52, 56) and the first attachment region (28) and/or the second attachment region (30) encompasses the longitudinal edges (52, 56).

6. The wiper frame (10) as claimed in claim 2, characterized in that the support rail (22) is divided into two in the longitudinal direction, into a first rail part (24) and a second rail part (26), and the first attachment region (28) mounts the wiper blade (12) between the first rail part (24) and the second rail part (26).

7. The wiper frame (10) as claimed in claim 1, characterized in that the wiper blade lip (44) has a substantially triangular outer contour in cross section.

8. The wiper frame (10) as claimed in claim 1, characterized in that the first bending region (32) has a first stabilizing region (36).

9. The wiper frame (10) as claimed in claim 8, characterized in that the second bending region (34) has a second stabilizing region (40) and a second resilient region (42).

10. The wiper frame (10) as claimed in claim 9, characterized in that the second resilient region (42) directly adjoins the wiper blade lip (44).

11. The wiper frame (10) as claimed in claim 9, characterized in that a second support shoulder (48) is provided on the second stabilizing region (40) of the second bending region (34).

12. The wiper frame (10) as claimed in claim 9, characterized in that the second resilient region (42) also intersects the plane.

13. The wiper frame (10) as claimed in claim 9, characterized in that a width of the second resilient region (42) is defined as a distance the second resilient region (42) extends between the wiper blade lip (44) and the second bending region (34), and
wherein the width of the second resilient region (42) is between 0.05 mm and 0.8 mm.

14. The wiper frame (10) as claimed in claim 13, characterized in that the width of the first and the second resilient regions (38, 42) is between 0.1 mm and 0.6 mm.

15. The wiper frame (10) as claimed in claim 14, characterized in that the width of the first and the second resilient regions (38, 42) is 0.35 mm.

16. The wiper frame (10) as claimed in claim 8, characterized in that the first support shoulder (46) is provided on the first stabilizing region (36) of the first bending region (32).

17. The wiper frame (10) as claimed in claim 1, characterized in that the first resilient region (38) directly adjoins the wiper blade lip (44).

* * * * *